United States Patent [19]

Nakai et al.

[11] Patent Number: 5,354,532
[45] Date of Patent: Oct. 11, 1994

[54] METHODS FOR MOLDING COMPOSITE POLYESTER ARTICLES HAVING RIGID AND FLEXIBLE REGIONS

[75] Inventors: Masakazu Nakai; Masato Takashima; Seizi Yamamoto, all of Shizuoka, Japan

[73] Assignee: Polyplastics Co., Ltd., Osaka, Japan

[21] Appl. No.: 756,850

[22] Filed: Sep. 10, 1991

[30] Foreign Application Priority Data

Sep. 10, 1990 [JP] Japan .................. 2-240412

[51] Int. Cl.$^5$ .................. B29C 45/16; B29C 65/70
[52] U.S. Cl. .................. 264/259; 264/250
[58] Field of Search ............ 264/259, 328.8, 328.17, 264/331.13, 250, 255, 246, 247, 275, 279, 279.1

[56] References Cited

U.S. PATENT DOCUMENTS

| | | | |
|---|---|---|---|
| 3,475,530 | 10/1969 | Cooper | 264/247 |
| 3,654,062 | 4/1972 | Loew | 264/247 |
| 4,201,209 | 5/1980 | LeVeen et al. | 264/255 |
| 4,254,241 | 3/1981 | Weinberg et al. | 525/408 |
| 4,307,058 | 12/1981 | Morello et al. | 264/247 |
| 4,373,113 | 2/1983 | Winkler | 264/251 |
| 4,385,025 | 5/1983 | Salerno | 264/255 |
| 4,459,257 | 7/1984 | Baciu | 264/255 |
| 4,565,849 | 1/1986 | Horikawa et al. | 525/420 |
| 5,160,474 | 11/1992 | Huff | 264/255 |

*Primary Examiner*—Jan H. Silbaugh
*Assistant Examiner*—Angela Ortiz
*Attorney, Agent, or Firm*—Nixon & Vanderhye

[57] ABSTRACT

Composite molded articles having relatively rigid and flexible resin regions are bonded to one another along an interfacial fusion zone. A normally solid thermoplastic polyalkylene terephthalate resin preform (which will constitute the relatively rigid region of the composite article) is placed in a mold cavity. The flexible region of the composite article is then formed by introducing a molten thermoplastic polyester elastomer resin into the mold cavity at a temperature which is greater than the melt temperature of the solid preform. The introduced thermoplastic polyester elastomer resin contacts and at least partially plasticizes a surface region of the solid preform along the interfacial bonding zone within the mold cavity to thereby cause the polyester elastomer resin to coalesce with the at least partially plasticized surface region of the polyester resin. Upon cooling and solidification, the solid preform and the polyester elastomer are fused to one another along the interfacial bonding zone.

3 Claims, No Drawings

METHODS FOR MOLDING COMPOSITE POLYESTER ARTICLES HAVING RIGID AND FLEXIBLE REGIONS

FIELD OF INVENTION

The present invention relates generally to methods of making composite molded articles of the type having discrete regions of a relatively highly rigid resin and a relatively flexible resin, and to the composite molded articles thereby obtained.

BACKGROUND AND SUMMARY OF THE INVENTION

Crystalline thermoplastic polyester resin, for example, polyalkylene terephthalate resins including polyethylene terephthalate (PET) and polybutylene terephthalate (PBT), are typically employed as engineering resins in numerous end-use applications due to their desirable physical and chemical properties (e.g., mechanical strengths, electrical properties, processability, etc.). Thus, crystalline thermoplastic polyester resins have been employed in the past to form molded components and parts in the automotive and electronics industries.

Polyalkylene terephthalate resins as a class generally exhibit relatively high rigidity, and are sometimes modified in this respect by melt-blending relatively more "flexible" resins. Of course, when resins are melt-blended, the properties of the blend represents a merger of the resin components forming the blend. Thus, in those end-use applications which require the resulting article to exhibit discrete portions or regions of rigidity and flexibility, modified melt-blends of polyalkylene terephthalate resins cannot be employed.

Molding techniques are known, however, that allow two (or more) discrete resins to be molded so that the resulting article will be a composite of all resins that were employed in the molding operation—i.e., the composite article will have discrete portions or regions corresponding respectively to the resins that are molded. These techniques are typically known as "double" or "two-color" molding methods and generally contemplate molding a preform of a desired article from a primary resin, and then molding a secondary resin onto the primary resin preform such that the primary and secondary resins contact one another along an interfacial boundary therebetween.

The interfacial molding techniques described above, however, sometimes do not produce composite articles of satisfactory quality and/or physical characteristics since it is difficult to fuse the primary and secondary resins one to another along their boundary interface. A composite article in which the primary and secondary resins are insufficiently fused or bonded is problematic since the respective portions of the article formed of the primary and secondary resins may separate or "peel" from one another along the interface boundary when subjected to external forces (e.g., loads during operation). As a result, such an article may warp to such an extent that it becomes unusable in its intended application.

In order to improve the interfacial bonding between dissimilar resins (e.g., resins having relatively high rigidity and flexibility), it has been proposed to include mechanical anchoring structures (e.g. an undercut or aperture region) along the interface boundary between the primary and secondary resins. In addition, adhesives have been applied along the interface boundary between two dissimilar resins in an attempt to provide enhanced bonding. As can be appreciated, however, the use of mechanical anchoring structures and/or adhesives in an effort to enhance the bonding efficacy between two dissimilar resins increases the complexity (and hence costs) of the article and/or the process for molding the same. As a result, composite articles formed by interfacial molding techniques are not typically capable of being produced economically and/or efficiently.

Specifically, interfacial molding techniques usually cannot be employed with highly crystalline polyalkylene terephthalate resin having a relatively high rigidity and a relatively more flexible resin to produce efficiently and economically a composite molded article having discrete regions of rigidity and flexibility attributable to the respective resins. Moreover, it is difficult to form a composite molded article of relatively highly rigid and flexible resins whereby the resins are sufficiently bonded one to another along an interfacial boundary. Thus, what has been needed are techniques to allow relatively rigid and flexible resins to be molded so as to form composite articles having desirably high bonding strength therebetween. It is towards achieving such needed molding techniques that the present invention is directed.

According to the present invention, molding techniques are provided which allow composite articles having discrete regions of relatively high rigidity and flexibility are provided. More particularly, composite molded articles having enhanced fusion strength at the interfacial boundary between one region formed of a relatively highly rigid resin and one region formed of a relatively flexible resin are provided according to this invention using a simple interfacial molding technique. Moreover, these composite articles can be formed without resorting to use of mechanical anchoring structures and/or all adhesive along the boundary interface. That is, the enhanced fusion between the relatively rigid and flexible regions of the composite article is achieved solely by means of the fusion between the relatively rigid and flexible resins along the interfacial boundary.

More specifically, according to the present invention, composite molded articles having relatively rigid and flexible resin portions are bonded to one another along an interfacial fusion zone. A normally solid thermoplastic polyalkylene terephthalate resin preform (which will constitute the relatively rigid position of the composite article) is first placed in a mold cavity. The flexible portion of the composite article is then formed by introducing a molten thermoplastic polyester elastomer resin into the mold cavity at a temperature which is greater than the melt temperature of the solid preform. The introduced thermoplastic polyester elastomer resin contacts and at least partially plasticizes a surface region of the solid preform along the interfacial bonding zone within the mold cavity to thereby cause the polyester elastomer resin to coalesce with the at least partially plasticized surface region of the polyester resin. Upon cooling and solidification, the solid preform and the polyester elastomer are thereby fused to one another along the interfacial bonding zone.

Further aspects and advantages of this invention will become more clear after careful consideration is given to the detailed description of the preferred exemplary embodiments thereof which follow.

DETAILED DESCRIPTION OF THE PREFERRED EXEMPLARY EMBODIMENTS

The polyalkylene terephthalate resin which is used for that portion of the composite article of the present invention having a relatively high rigidity is the polycondensation reaction product of terephthalic acid or its ester forming derivatives with an alkylene glycol having 2 to 4 carbon atoms or its ester forming derivatives. Polyethylene terephthalate and polybutylene terephthalate are preferred resins, with polybutylene terephthalate being particularly preferred.

Furthermore, the polyalkylene terephthalate may be a copolymer comprising the above-described comonomers and further containing no more than 30% by weight of a third comonomer component. Examples of the third comonomeric include known dicarboxylic acids such as isophthalic, naphthalenedicarboxylic, diphenyldicarboxylic, diphenyletherdicarboxylic, diphenylethanedicarboxylic, cyclohexanedicarboxylic, adipic and sebacic acids, and alkyl-, alkoxy- and halogen-substituted products of these acids. It is also possible to use during the polycondensation reaction, the above-described dicarboxylic acid compounds in the form of a derivative capable of forming an ester, for example, a lower alcohol ester such as a dimethyl ester, so as to introduce constituent units as a copolymer component.

Examples of dihydroxy compounds that may be used as the third component for the polyalkylene terephthalate copolymer include dihydroxy compounds having a relatively low molecular weight, such as neopentyl glycol, hydroquinone, resorcinol, dihydroxyphenyl, naphthalenediol, dihydroxydiphenyl ether, cyclohexanediol, 2,2-bis(4-hydroxyphenyl)propane and diethoxylated bisphenol A, as well as alkyl-, alkoxy- and halogen-substituted products of such dihydroxy compounds.

Examples of hydroxycarboxylic acids as the third comonomer component include hydroxycarboxylic acids such as hydroxybenzoic, hydroxynaphthoic and diphenyleneoxycarboxylic acids, and alkyl-, alkoxy- and halogen-substituted products of these acids. It is also possible to use ester-forming derivatives of these compounds.

The copolymer may have a branched or crosslinked structure that is formed by the addition of a small amount of a trifunctional monomer, for example, trimellitic acid, trimesic acid, pyromellitic acid, pentaerythritol, trimethylolpropane or the like, into the reactive mixture which includes the above-described comonomers. These comonomers may be introduced in the form of a mixture of two or more of the same.

In the present invention, virtually any thermoplastic polyesters formed by polycondensing the above-described comonomers may be used to as the polyalkylene terephthalate resin forming a relatively highly rigid region in the composite article. Since the polyalkylene terephthalate resin inherently is a relatively rigid resin, the comonomer content should, however, not be greater than 30% by weight, preferably not more than 25% by weight of the polymer. By the term "rigid" and like terms is meant that the modulus in bending of the polyalkylene terephthalate resin is not less than 15000 kgf/cm$^2$, and more preferably not less than 20000 kgf/cm$^2$.

The polyalkylene terephthalate resin described above is generally used as a primary resin according to the interfacial molding techniques according to the present invention. That is, the polyalkylene terephthalate resin is first preferably formed into a normally solid preform of the desired article which is placed into a mold prior to introducing the polyester elastomer as a secondary resin into the mold. According to the present invention, enhanced fusing strength at the boundary interface between the polyalkylene terephthalate and polyester elastomer regions is achieved by causing the surface region of the polyalkylene terephthalate preform article to at least partially plasticize (melt) during introduction of the molten secondary polyester elastomer resin into the mold cavity. Thus, the melt temperature of the polyalkylene terephthalate resin is an important parameter to consider according to the process of this invention.

In this connection, the melt temperature of the polyalkylene terephthalate resin is preferably 230° C. or less, and more preferably 220° C. or less. When the melt temperature of the polyalkylene terephthalate resin is excessively high, it is necessary to increase the temperature of the polyester elastomer when it is introduced into the mold cavity. A significant increase in the temperature of the molten polyester elastomer may, however, cause thermal decomposition of the polyester elastomer, as well as promoting difficulties during molding due to its decreased viscosity. On the other hand, when the melt temperature of the polyalkylene is excessively low, deformation tends to occur when the molten polyester elastomer resin is introduced into the mold which may deleteriously affect the rigidity of the polyalkylene terephthalate resin.

The melt temperature of the polyalkylene terephthalate resin may be selectively regulated by the type of polyalkylene terephthalate resin used and/or the type and amounts of the various comonomers that are employed during the polycondensation reaction to form the same. A copolymer comprised mainly of polybutylene terephthalate units and between 25 to 2% by weight of a third comonomeric component as described above is especially preferred since it exhibits a desirable combination of melt temperature and physical characteristics.

A minor amount of an auxiliary thermoplastic resin may be blended with the polyalkylene terephthalate resin so as to impart desired property characteristics thereto. Examples of auxiliary thermoplastic resins include polyolefins, polyamides, polyesters other than the polyester employed as the highly rigid resin component (for example, wholly aromatic polyester), styrene polymers (for example, AS or ABS resins), polyphenylene oxides, acrylate polymers, polyacetals, polysulfones, polyethersulfones, polyetherimides, polyetherketones, polyarylene sulfides, and fluororesins. It is also possible to use these thermoplastic resins in the form of a mixture of two or more of the same. When blending another thermoplastic resin as the auxiliary additive, the rigidity, melt temperature and the other physical characteristics of the resulting blend should be taken into consideration.

Furthermore, it is also possible to blend the polyalkylene terephthalate resin with an inorganic filler material. The addition of the filler material is preferred so as to obtain excellent properties in respect of the mechanical strength, heat resistance, dimensional stability, electrical properties, and the like. In particular, the addition of an inorganic filler material is useful to further enhance the rigidity of the polyalkylene terephthalate resin. Fibrous, particulate or flaky fillers may be used depending upon the intended properties that may be desired.

Examples of the fibrous filler materials include inorganic fibrous substances such as fibers of glass, asbestos, carbon, silica, silica-alumina, zirconia, boron nitride, silicon nitride, boron, and potassium titanate, and fibrous metals such as stainless steel, aluminum, titanium, copper, and brass. Among them, glass fiber is a representative fibrous filler that may be employed. It is also possible to use high-melting organic fibrous materials such as polyamides, fluororesins, or acrylic resins.

Examples of particulate filler materials include silicates such as carbon black, silica, quartz powder, glass beads, glass powder, calcium silicate, aluminum silicate, kaolin, talc, clay, diatomaceous earth and wollastonite, metallic oxides such as iron oxide, titanium oxide and alumina, metal salts of carbonic acid such as calcium carbonate and magnesium carbonate, metal salts of sulfuric acid such as calcium sulfate and barium sulfate, and other fillers such as silicon carbide, silicon nitride, boron nitride, and various powdery metals.

Examples of flaky filler materials include mica, glass flakes, and various metal foils.

These inorganic fillers may be used alone or in any combination of two or more of the same. A combination of a fibrous filler, particularly glass fibers or carbon fibers with a particulate or flaky filler is particularly preferred so as to impart a combination of mechanical properties with dimensional stability, electrical properties, and the like.

The inorganic filler material may be added to the polyalkylene terephthalate resin in amounts of 50% by weight or less based on the total weight of the polyalkylene terephthalate resin. Excessive amounts of filler material may however, cause the moldability and toughness of the resin to deteriorate.

The polyester elastomer resin which constitutes the flexible portion of the composite molded article according to the present invention is the polycondensation reaction product of (a) a dicarboxylic acid and/or its ester forming derivative; (b) a low molecular weight glycol and/or its ester forming derivative; and (c) a polyoxyalkylene glycol having an average molecular weight of 400 to 6000 and/or its ester forming derivative. Furthermore, the polyoxyalkylene glycol component is present in the polyester elastomer in amounts between 5 to 95% of the polyester elastomer's total weight. The polyester elastomer is a random or block copolyester comprising ester units derived from the comonomer components (a) and (b) and polyoxyalkylene glycol ester segments derived from the comonomer components (a) and (c). The copolyester elastomer may further comprise as an auxiliary additive an ester-forming monomer other than those described above.

Examples of the dicarboxylic acid component include aromatic, aliphatic and alicyclic dicarboxylic acids. Specific examples of aromatic dicarboxylic acids include terephthalic, isophthalic, phthalic, naphthalenedicarboxylic, and diphenyldicarboxylic acids, which may be substituted with a $C_1$ to $C_{10}$ alkyl group, an alkoxy group, an aryl group, a sulfone group, a halogen or the like. Specific examples of the aliphatic and alicyclic dicarboxylic acids include sebacic, cycloalkylenedicarboxylic, adipic, glutaric, succinic, oxalic, itaconic, azelaic, diethylmalonic, fumaric, and cyclohexenedicarboxylic acids, which may be substituted with an alkyl group, an alkoxy group, an aryl group, a sulfone group, a halogen or the like. It is also possible to use these dicarboxylic acids in the form of their ester-forming derivatives. Terephthalic acid, isophthalic acid and their methyl esters are particularly preferred.

Open-chain glycols, cyclic glycols, aromatic glycols, and the like may be used as the low molecular weight glycol component. Specific examples include glycols having 2 to 15 carbon atoms, such as ethylene glycol, propylene glycol, isobutylene glycol, tetramethylene glycol, butenediol, pentamethylene glycol, hexamethylene glycol, decamethylene glycol, dihydroxycyclohexane, cyclohexanedimethanol and hydroquinone; and phenols such as bis(hydroxy)-diphenyl, bis(hydroxyphenyl)methane, bis-(hydroxyphenyl)methane and bis(-hydroxyphenyl)ethane. The glycols may further be substituted with an alkyl group, a halogen or the like. It is also possible to use these glycols in the form of their ester-forming derivatives. Ethylene glycol, tetramethylene glycol, butenediol and its ester-forming derivatives are particularly preferred.

The polyoxyalkylene glycol having a molecular weight of 400 to 6000 is preferably a polymer of an alkylene oxide having 2 to 10 carbon atoms. Examples of the polyoxyalkylene glycol include poly(ethylene oxide) glycol, poly(trimethylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly(decamethylene oxide) glycol, and alkyl-substituted products of these glycols.

The polyoxyalkylene glycol may be in a copolymerized state in any form of a random copolymer, a block copolymer or the like.

It is also possible to use the above-described polyoxyalkylene glycols in the form of their ester-forming derivatives. Among the polyoxyalkylene glycols, poly(tetramethylene oxide) glycol and poly(ethylene oxide) glycol are preferred. The polyoxyalkylene glycols may be used also in any combination of two or more of the same when producing the polyester elastomer.

The polyoxyalkylene glycol is introduced into the polymer chain of the polyester elastomer in an amount between 5 and 95% by weight, preferably between 10 and 90% by weight based on the total weight of the polyester elastomer. When the amount of the polyoxyalkylene glycol is excessively small, the flexibility of the polyester elastomer is insufficient. On the other hand, when it is excessively large, the polyester elastomer is excessively flexible to an extent that problems of moldability ensue. The polyester elastomer may further comprise a minor amount of a further comonomer.

The polyester elastomer used in the present invention may be a composition comprising the above-described polyester elastomer which is blended with a minor amount of another thermoplastic resin as an auxiliary additive. In this case, the thermoplastic resin as the auxiliary additive may be the same as the auxiliary additives discussed above in connection with the polyalkylene terephthalate resin. Since, however, the polyester elastomer resin is used as a material which constitutes a flexible portion in the composite molded article, the incorporation of a "rigid" resin is not preferred.

By the term "flexible" and like terms is meant the modulus in bending of the resin polyester elastomer is preferably 10000 kgf/cm$^2$ or less. Virtually any desired modulus in bending falling within the above-described definition can be achieved by selectively regulating the structural arrangement of the polyester elastomer by selectively varying the type and/or amounts of the comonomeric components that are used during polymerization.

The polyalkylene terephthalate and/or polyester elastomer used in the present invention may be blended with known materials (other than those described above) of the type that are generally added to conventional thermoplastic resins. For example, various stabilizers such as antioxidants and ultraviolet absorbers, antistatic agents, flame retardants, flame retardant assistants, colorants such as dyes and pigments, lubricating agents, plasticizers, crystallization accelerators, nucleating agents, mold-release agents may be incorporated into the resins for the purpose of imparting desired properties in dependence upon the intended end-use applications.

The composite molded articles having discrete regions of relative rigidity and flexibility corresponding to the polyalkylene terephthalate and polyester elastomer resins, respectively, described above are formed using any conventional interfacial molding technique (i.e., so-called "double" or "two-color" molding methods). In this connection, injection molding, compression molding and like techniques may generally be employed, with injection molding be especially preferred.

According to the present invention, the polyalkylene terephthalate resin is most preferably formed into a preform of the desired article and positioned within the cavity of a suitable mold. Thereafter, the polyester elastomer may be introduced into the remainder of the mold cavity so that it comes into contact with a surface region of the polyalkylene terephthalate resin preform. In this connection, it is necessary according to the present invention to introduce the polyester elastomer in a molten state at a temperature which is sufficiently greater than the melt temperature of the polyalkylene terephthalate preform so as to cause the surface region of the preform to at least partially plasticize (melt) upon contact with the introduced molten polyester elastomer. Partial plasticization of the surface region of the polyalkylene terephthalate preform in contact with the polyester elastomer is important as it allows the polyalkylene terephthalate and the polyester elastomer along the boundary interface therebetween to coalesce such that, upon solidification, a strong fusion bond is formed.

It is especially preferred that the polyester elastomer be introduced into the mold cavity in a molten state at a temperature that is between 10° C. to 70° C. greater than the melt temperature of the polyalkylene terephthalate resin preform. Care should be taken to avoid excessive temperatures of the polyester elastomer when it is introduced into the mold cavity since, as indicated previously, the polyester elastomer may deteriorate and/or degrade at such excessively high temperature. The melt temperature of the polyalkylene terephthalate resin is preferably 230° C. or less, and more preferably 220° C. or less. As described above, the melt-temperature of the polyalkylene terephthalate resin can be regulated by properly selecting the comonomeric components employed during polymerization as well as the amounts that units derived from such comonomeric units are incorporated into the polymer chain.

Furthermore, the melt temperature of the polyalkylene terephthalate may be selectively adjusted by melt-blending a minor amount of an auxiliary thermoplastic resin therewith. Since, however, incorporation of an auxiliary thermoplastic resin may diminish the rigidity of the resulting polyalkylene terephthalate blend, the selection of any auxiliary thermoplastic component and the amounts in which it is incorporated should be such that the resulting rigidity" of the blend is within the definition as described previously.

The resulting composite article according to the present invention exhibits strong fusion bonding at the boundary interface between the discrete relatively rigid and flexible resin regions. That is, the relatively rigid and flexible resins coalesce with one another at the boundary interfaced therebetween such that, upon solidification, a strong interfacial bond between the rigid and flexible regions ensues. Specifically, the composite articles according to the present invention consistently exhibit a peel strength of at least 1.0 kg, and typically greater than 3.5 kg due to the strong interfacial bonding between the rigid and flexible resin regions that results.

Thus, according to the present invention, composite molded articles having discrete rigid and flexible regions may be manufactured which also exhibit excellent heat stability as well as the desirable physical, mechanical, electrical and chemical properties that are inherent with polyester resins. Thus, the composite articles may be employed in a number of end-use applications where chemical stability (particularly against chemicals, solvents, lubricating agents, detergents and the like) is desired.

EXAMPLES

The present invention will further be described by referring to the following non-limiting Examples.

Example 1

A flat plate of 80 mm square having a thickness of 2 mm was formed as a primary molded article through the use of polybutylene terephthalate resin (melting point; 225° C.) (A-1) as resin material (A). The flat plate was then placed in a mold cavity of 80 mm square having a depth of 4 mm, and secondary molding was conducted by making use of a resin material (B) of a polyester elastomer (melting point: about 180° C.) (B-1) comprising butylene terepthalate units and poly(tetramethylene oxide) glycol terephthalate units (about 40%) as the secondary material with varied resin temperature, thereby forming flat composite molded articles. The surface state of each molded article was observed and the peeling strength at the interface was measured to give the results of Table 1.

The surface state was evaluated by visual observation of the smoothness, discoloration of the accompanying molding, and the like.

The peeling strength was measured by cutting the composite molded article so as to have a width of 10 mm, forcibly peeling the bonded interface of one end by a given length with a knife, setting each sample to a fixture of a tensile testing machine and pulling the sample. The maximum load necessary for causing the peeling was defined as the peeling strength.

Example 2

A composite molded article was formed under the same condition as that of Example 1, except that the resin material (A) was a composition (A-2) comprising the above-described polybutylene terephthalate (about 60% by weight), a glass fiber (about 20% by weight) and a glass flake (about 20% by weight), and evaluation of the molded articles was conducted in the same manner as that of Example 1. The results are given in Table 1.

TABLE 1

Examples 1 and 2

| Primary material resin (A) | Secondary material resin (B) | Secondary resin temperature | Surface state | Peeling strength (kg) |
| --- | --- | --- | --- | --- |
| Ex. 1 | | | | |
| PBT resin (m.p.: 225° C.) (A-1) | polyester elastomer (m.p.: ca. 180° C.) (B-1) | 250° C. 260° C. 280° C. | good good slightly poor | 3.1 4.7 10.3 |
| Ex. 2 | | | | |
| composition comprising PBT resin (m.p.: 225° C.) glass fiber (20 wt. %), and glass flake (20 wt. %), (A-2) | polyester elastomer (m.p.: ca. 180° C.) (B-1) | 250° C. 260° C. 280° C. | good good slightly poor | 2.0 3.5 8.8 |

Examples 3 and 4

The formation and evaluation of the molded articles were conducted in the same manner as that of the above Examples, except that the resin material (A) was a polybutylene terephthalate copolymer (melting point: 205° C.) (A-3) comprising butylene terephthalate units as a main component and introduced thereinto about 15% by weight of butylene isophthalate units and the resin material (5) was the above-described material (B-1) or a polyester elastomer (B-2) (melting point: 195° C.) comprising butylene terephthalate units and poly(tetramethylene oxide) glycol terephthalate units (25% by weight). The results are given in Table 2.

TABLE 2

Examples 3 and 4

| Primary material resin (A) | Secondary material resin (B) | Secondary resin temperature | Surface state | Peeling strength (kg) |
| --- | --- | --- | --- | --- |
| Ex. 3 | | | | |
| PBT copolymer (m.p.: 205° C.) (A-3) | polyester elastomer m.p.: ca. 180° C. (B-1) | 220° C. 230° c. 240° C. 250° C. 260° C. 280° C. | good good good good good slightly poor | 4.0 13.5 14.7 15.5 16.0 16.3 |
| Ex. 4 | | | | |
| PBT copolymer (m.p.: 205° C.) (A-3) | polyester elastomer m.p.: ca. 195° C. (B-2) | 220° C. 230° C. 240° C. 250° C. 260° C. 280° C. | good good good good good slightly poor | 2.8 7.7 11.3 13.2 14.6 15.6 |

Example 5

Composite molded articles were formed and evaluated in the same manner as that of Example 3, except that the resin material (A) was a composition (A-4) comprising the above-described resin material (A-3) and blended therewith with a glass fiber (20%) by weight) and a glass flake (20% by weight). The results are given in Table 3.

TABLE 3

Examples 5

| Primary material resin (A) | Secondary material resin (B) | Secondary resin temperature | Surface state | Peeling strength (kg) |
| --- | --- | --- | --- | --- |
| Ex. 5 | | | | |
| Composition comprising PBT copolymer (A-3), glass fiber (20 wt. %), and glass flake (20 wt. %), (A-4) | polyester elastomer (B-1) | 220° C. 230° c. 240° C. 250° C. 260° C. 280° C. | good good good good good slightly | 1.4 2.8 4.2 10.2 13.0 14.1 |

Example 6

Composite molded articles were formed and evaluated in the same manner as that of Example 3, except that the resin material (A) was a polybutylene terephthalate copolymer (melting point: 187° C.) (A-5) comprising butylene terepthalate units as the main component and introduced thereinto about 16% by weight of diethoxylated bisphenol A as the comonomer. The results are given in Table 4.

Example 7

Composite molded articles were formed and evaluated in the same manner as that of Example 6, except that the resin material (A) was a resin composition comprising the same polybutylene terephthalate copolymer (A-5) as that of the Example 6 and blended therewith a glass fiber (20% by weight) and a glass flake (20% by weight). The results are given in Table 4.

TABLE 4

Examples 6 and 7

| Primary material resin (A) | Secondary material resin (B) | Secondary resin temperature | Surface state | Peeling strength (kg) |
| --- | --- | --- | --- | --- |
| Ex. 6 | | | | |
| PBT copolymer (m.p.: 187° C.) (A-5) | polyester elastomer (m.p.: ca. 180° C.) (B-1) | 220° C. 230° c. 240° C. 250° C. 260° C. 280° C. | good good good good good poor | 8.9 14.5 15.2 15.9 16.3 16.5 |
| Ex. 7 | | | | |
| composition comprising PBT copolymer (A-5), glass fiber (20 wt. %), and glass flake (20 wt. %), (A-6) | polyester elastomer (m.p.: ca. 180° C.) (B-1) | 220° C. 230° c. 240° C. 250° C. 260° C. 280° C. | good good good good good poor | 4.1 13.3 14.2 15.0 15.6 16.0 |

Comparative Examples 1 to 4

The formation and evaluation of the molded articles were conducted in the same manner as that of the above-described Examples, except that the resin material (A) was a polybutyl terephthalate (A-1) or polybutylene terephthalate copolymer (A-3) and a polyamide elastomer (B'-1) (melting point: 170° C.) or a polyurethane elastomer (B'-2) (melting point: about 160° C.) was used instead of the polyester elastomer corresponding to the resin material (B). The results are given in Table 5.

TABLE 5

| Primary material resin (A) | Secondary material resin (B) | Secondary resin temperature | Surface state | Peeling strength (kg) |
|---|---|---|---|---|
| Comparative Examples 1 to 4 | | | | |
| Comp. Ex. 1 | | | | |
| (A-1) | polyamide elastomer (B'—1) | 250° C. 260° C. | good slightly poor | <1 <1 |
| Comp. Ex. 2 | | | | |
| (A-1) | polyurethane elastomer (B'—2) | 230° C. 250° C. | poor poor | <1 <1 |
| Comp. Ex. 3 | | | | |
| (A-1) | polyamide elastomer (B'—1) | 250° C. 260° C. | good slightly poor | 1.5 1.8 |
| Comp. Ex. 4 | | | | |
| (A-1) | polyurethane elastomer (B'—2) | 230° C. 250° C. | poor poor | 1.1 1.5 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of molding a composite molded article having discrete regions of relatively rigid and flexible resins bonded to one another along an interfacial fusion zone, said method comprising the steps of:

positioning within a mold cavity a solid preform which will constitute said discrete region of said relatively rigid resin of said composite article and which consists essentially of a thermoplastic polyalkylene terephthalate resin selected from the group consisting of homopolymers of polybutylene terephthalate or polyethylene terephthalate, and copolymers mainly comprised of recurring polybutylene terephthalate or polyethylene terephthalate units and no greater than 30% by weight of other comonomeric units; and then forming said discrete regions of said flexible resin of said composite article which is bonded to said rigid region by introducing, into said mold cavity at a temperature which is between 10° C. to 70° C. greater than the melt temperature of said polyester resin forming said solid preform, a thermoplastic polyester elastomer resin which is the polycondensation reaction product of (a) a dicarboxylic acid or its ester-forming derivative, (b) a low molecular weight glycol or its ester-forming derivative, and (c) a polyoxyalkylene glycol having an average molecular weight of between 400 to 6000 or its ester-forming derivatives;

establishing an interfacial fusion zone between said thermoplastic polyester and a surface region of said solid preform by allowing said introduced thermoplastic polyester elastomer resin to contact and at least partially melt said surface region of said solid preform by virtue of said thermoplastic polyester elastomer resin being at a temperature which is between 10° C. to 70° C. greater than the melt temperature of said polyester resin forming said solid preform thereby to establish said interfacial fusion zone and to cause said polyester elastomer resin to coalesce with said at least partially melted surface region of said polyester resin; and then allowing said at least partially melted surface region of said thermoplastic polyester resin and said molten polyester elastomer to solidify thereby fusing said solid preform and said polyester elastomer along said interfacial fusion zone, whereby said discrete regions of relatively rigid and flexible resins of said composite article are bonded one to another with increased fusion strength along said interfacial fusion zone.

2. A method as in claim 1, wherein the thermoplastic polyester resin has a melt temperature of 230° C. or less.

3. A method as in claim 1, wherein units derived from said polyoxyalkylene glycol or its ester-forming derivatives are present in an amount between 5 to 95% by weight of said polyester elastomer.

* * * * *